(12) United States Patent
Messer

(10) Patent No.: US 12,125,290 B2
(45) Date of Patent: Oct. 22, 2024

(54) VEHICLE SYSTEM WITH A SAFETY MECHANISM AND METHOD OF OPERATION THEREOF

(71) Applicant: MOJ.IO, Inc., Vancouver (CA)

(72) Inventor: Alan Messer, Los Gatos, CA (US)

(73) Assignee: MOJ.IO, Inc., Vancouver (CA)

( * ) Notice: Subject to any disclaimer, the term of this patent is extended or adjusted under 35 U.S.C. 154(b) by 347 days.

(21) Appl. No.: 16/861,062

(22) Filed: Apr. 28, 2020

(65) Prior Publication Data

US 2021/0335130 A1   Oct. 28, 2021

(51) Int. Cl.
| | |
|---|---|
| H04N 7/18 | (2006.01) |
| B60R 1/00 | (2022.01) |
| B60R 11/04 | (2006.01) |
| G06V 10/25 | (2022.01) |
| G06V 20/58 | (2022.01) |
| G08G 1/16 | (2006.01) |

(52) U.S. Cl.
CPC .............. *G06V 20/58* (2022.01); *B60R 11/04* (2013.01); *G06V 10/25* (2022.01); *G08G 1/161* (2013.01); *H04N 7/183* (2013.01); *B60R 2300/8093* (2013.01); *G06V 2201/07* (2022.01)

(58) Field of Classification Search
CPC ........... G08G 1/161; B60R 1/00; B60R 11/04; B60R 2300/8093; G06V 10/22; G06V 10/42; G06V 20/58; G06V 2201/07; G06V 10/25; H04N 7/183

USPC ....................................................... 382/103
See application file for complete search history.

(56) References Cited

U.S. PATENT DOCUMENTS

| | | | |
|---|---|---|---|
| 7,231,288 B2 | 6/2007 | Koulinitch | |
| 9,361,528 B2 | 6/2016 | Nonaka et al. | |
| 2006/0212215 A1 | 9/2006 | Koulinitch | |
| 2014/0241578 A1 | 8/2014 | Nonaka et al. | |
| 2016/0180531 A1* | 6/2016 | Lessmann | G06T 7/246 382/103 |
| 2018/0365509 A1* | 12/2018 | Naserian | G06V 10/25 |
| 2019/0103026 A1* | 4/2019 | Liu | G06V 20/58 |
| 2019/0289273 A1* | 9/2019 | Mabuchi | G06V 10/772 |
| 2019/0311494 A1* | 10/2019 | Ramalingam | G06F 18/2413 |
| 2019/0318481 A1* | 10/2019 | Chen | G06T 7/12 |
| 2019/0384294 A1 | 12/2019 | Shashua et al. | |
| 2020/0026282 A1 | 1/2020 | Choe et al. | |
| 2020/0326179 A1* | 10/2020 | Tong | G06V 20/58 |
| 2021/0089794 A1* | 3/2021 | Chen | G06K 9/6256 |

FOREIGN PATENT DOCUMENTS

EP   2863361 A1   4/2015

* cited by examiner

*Primary Examiner* — Susan E. Torgerson
(74) *Attorney, Agent, or Firm* — Perspectives Law Group, Corp.

(57) ABSTRACT

A method of operation of a vehicle system includes receiving an image from a visual sensor, identifying an item of interest based on the image, generating a bounding box around the item of interest, categorizing a target object based on the item of interest within the bounding box, calculating a distance based on a width of the bounding box, and communicating the distance for assisting in operation of the vehicle.

20 Claims, 6 Drawing Sheets

VEHICLE SYSTEM WITH A SAFETY MECHANISM AND METHOD OF OPERATION THEREOF

TECHNICAL FIELD

An embodiment of the present invention relates generally to a vehicle system, and more particularly to a system that can determine a distance of an object.

BACKGROUND ART

Modern transportation systems, especially vehicle systems such as manually driven vehicles to vehicles with at least some level of autonomous operation, are providing increasing levels of functionality to support modern life including additional status monitoring, safety, and connectivity services. Research and development in the existing technologies can take a myriad of different directions.

As users become more empowered with the growth of these modern transportation systems, new and old paradigms begin to take advantage of this new space. One such space is increased safety information for these vehicles. Thus, a need still remains for a vehicle system with a safety mechanism.

Solutions to these problems have been long sought but prior developments have not taught or suggested any solutions and, thus, solutions to these problems have long eluded those skilled in the art.

DISCLOSURE OF INVENTION

An embodiment of the present invention provides a method of operation of a vehicle system including: receiving an image from a visual sensor, identifying an item of interest based on the image, generating a bounding box around the item of interest, categorizing a target object based on the item of interest within the bounding box, calculating a distance based on a width of the bounding box, and communicating the distance for assisting in operation of a vehicle.

An embodiment of the present invention provides a vehicle system, including: a control circuit configured to receive an image from a visual sensor, identify an item of interest based on the image, generate a bounding box around the item of interest, categorize a target object based on the item of interest within the bounding box, calculate a distance based on a width of the bounding box; and a communication circuit, coupled to the control circuit, configured to communicate the distance for assisting in operation of a vehicle.

An embodiment of the present invention provides a non-transitory computer readable medium including instructions for a vehicle system, including: receiving an image from a visual sensor, identifying an item of interest based on the image, generating a bounding box around the item of interest, categorizing a target object based on the item of interest within the bounding box, calculating a distance based on a width of the bounding box, and communicating the distance for assisting in operation of a vehicle.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
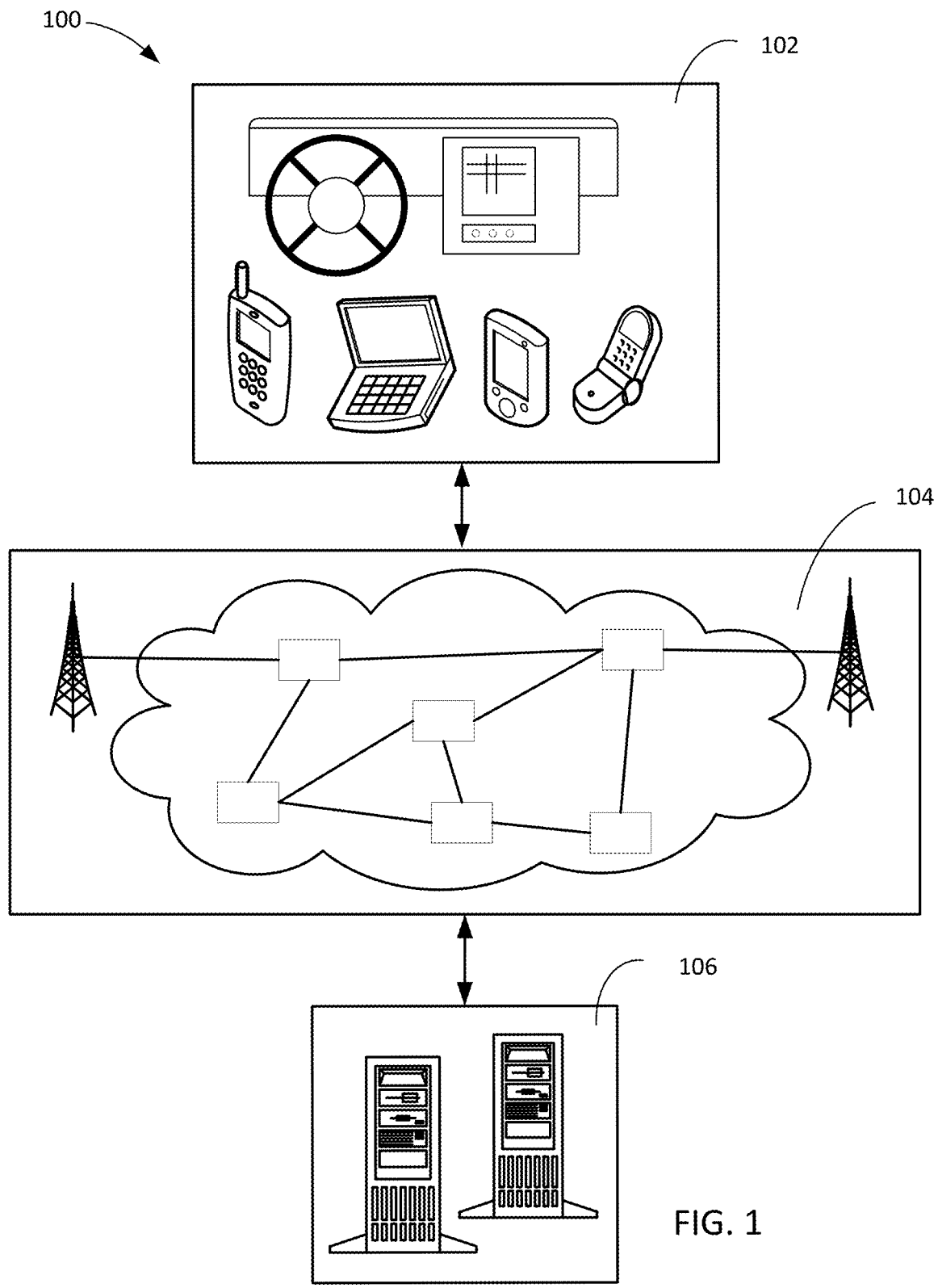
FIG. 1 is a vehicle system with a safety mechanism in an embodiment of the present invention.

Embodiments provide the vehicle system, the vehicle, or a combination thereof can increase safety without the need for expensive equipment Embodiments provide the vehicle system, the vehicle, or a combination thereof the capability to track the driving habits of a driver. Embodiments provide the vehicle system, the vehicle, or a combination thereof to improve the safe driving habits of a driver by providing feedback to driving performance.

Embodiments can provide the efficient of measuring distance for cars in front in real-time and lower cost. Embodiments utilize a trained artificial intelligence model to use minimal information from the bounding box around the car in front or the target object. The minimal information is the width, the height, the perimeter, or a combination thereof of the bounding box to ascertain the distance of the target object in front. The dimensions, including the width, of the bounding box can quickly represent the distance because of the training of artificial intelligence model with the rear portion of the target object and for various vehicle types and models. The artificial intelligence model of the vehicle system can also be trained to compensate for different elevations and relative locations on curves or both to accurately measure the distance. The artificial intelligence model can also be trained as part of the post-processing. The artificial intelligence model can also work with the side portion of the target object as well to help generate the accuracy of the distance.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect, without or with, respectively, intervening items between coupled items, or a combination thereof. The coupling can be by physical contact, by communication between items or a combination thereof.

Referring now to FIG. 1, therein is shown a vehicle system 100 with a start mechanism in an embodiment of the present invention. The vehicle system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, or vehicle embedded telematics system. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the vehicle system 100 is described with the second device 106 as a computing device, although it is understood that the second device 106 can be different types of devices, such as a standalone sensor or measurement device. Also for illustrative purposes, the vehicle system 100 is shown with the second device 106 and the first device 102 as end points of the communication path 104, although it is understood that the vehicle system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless local area network (WLAN) products that are based on the Institute of Electrical and Electronics Engineers' (IEEE) 802.11 standards (Wi-Fi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
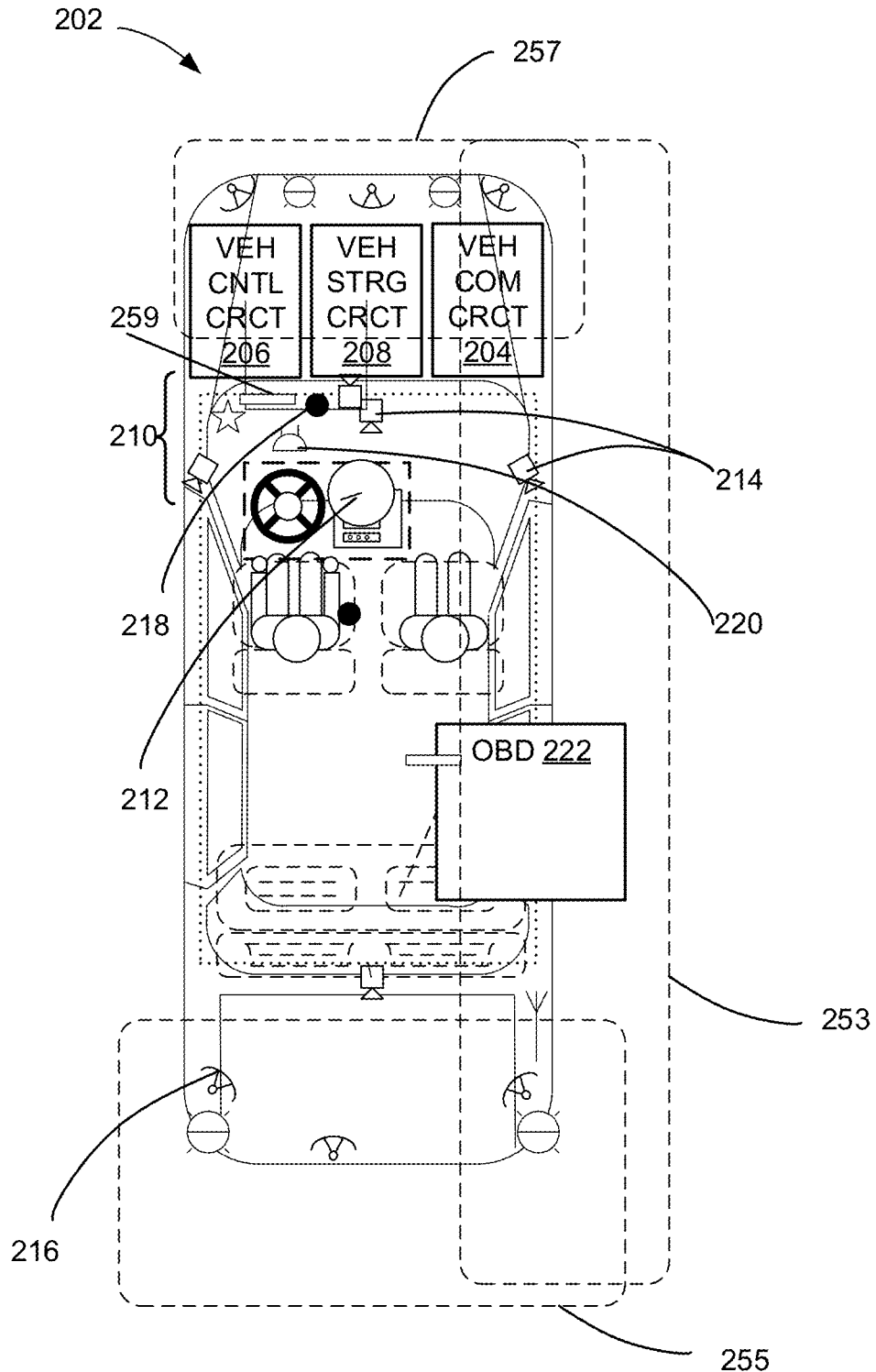
FIG. 2 is an example a top plan view illustration of various vehicles for the vehicle system.

Referring now to FIG. 2, therein is shown an example a top plan view of various a vehicle 202 for the vehicle system 100 of FIG. 1. As an example, the vehicle system 100 can include or interact with the first device 102 of FIG. 1 the vehicle 202. The vehicle 202 can also include one or more of environmental sensors 210. The vehicle 202 is an object or a machine used for transporting people or goods. The vehicle 202 can also be capable of providing assistance in maneuvering or operating the object or the machine. The vehicle 202 can include or represent different types of vehicles. For example, the vehicle 202 can be an electric vehicle, a combustion vehicle, or a hybrid vehicle. Also for example, the vehicle 202 can be an autonomous vehicle or non-autonomous vehicle. As a specific example, the vehicle 202 can include a car, a truck, a cart, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208. The on-board diagnostics 222 represent information about the vehicle 202. For example, the on-board diagnostics 222 can provide status or the state of the vehicle 202 or a portion thereof.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the vehicle system 100 or vehicle manufacturer, or a combination thereof. The vehicle storage circuit 208 can store the information for the on-board diagnostics 222.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the vehicle system 100, or a combination thereof. The vehicle control circuit 206 can respond to requests for the on-board diagnostics 222. The request can be from other parts of the vehicle 202, the vehicle system 100, or a combination thereof or external to the vehicle system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide the on-board diagnostics 222 to other portions of the vehicle 202, the vehicle system 100, or a combination thereof or external to the vehicle system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle 202. The environmental sensors 210 can detect, identify, determine, or a combination thereof for the vehicle 202 itself, such as for status or movement thereof. The environmental sensors 210 can detect, identify, determine, or a combination thereof for environment within a cabin of the vehicle 202, an environment external to and surrounding the vehicle 202, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle 202, determine a movement of the vehicle 202, or a combination thereof. Examples of the location-movement sensor 212 can include an accelerometer, a speedometer, a GPS receiver or device, a gyroscope or a compass, or a combination thereof. The vehicle 202 can include the environmental sensors 210 other than or in addition to the location-movement sensor 212, such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202.

The vehicle 202 can use one or more of the environmental sensors 210 to generate the on-board diagnostics 222 describing or representing information regarding the environment within or surrounding the vehicle 202. The on-board diagnostics 222 can be further processed with the vehicle control circuit 206, stored in the vehicle storage circuit 208, communicated to another device through the vehicle control circuit 206, or a combination thereof.

The vehicle 202 can further include a user device or a mobile device illustrated in FIG. 1. For example, the vehicle 202 can include the first device 102. As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202.

Also as a more specific example, the vehicle 202 can include or be integral with the first device 102 including an embedded computer system, an infotainment system, a smart driving or a driver assistance system, a self-driving or a maneuvering system for the vehicle, or a combination thereof.

The vehicle 202 can include a front portion 257, a rear portion 255, and a side portion 253 or a combination thereof. The front portion 257 can be opposite to the rear portion 255. For clarity and as an example, the front portion 257, the rear portion 255, and the side portion 253 are labeled in FIG. 2 relative to the vehicle 202. As examples, the front portion 257, the rear portion 255, and the side portion 253 are labeled in FIG. 2 with a dashed outline to provide the respective portion of the vehicle 202 that can be viewed with respective to the embodiment.

The side portion 253 can include one end that is adjacent to the front portion 257, and can include an opposite end that is adjacent to the rear portion 255. The side portion 253 is not considered the front portion 257 nor the rear portion 255. The front portion 257 is the portion that is facing the direction as the movement of the vehicle 202. The rear portion 255 portion that is facing the opposite direction from the movement of the vehicle 202.

The vehicle 202 can include a vehicle display 259. The vehicle display 259 can present an image, an alphanumeric character, a sound, a video, or a combination thereof. The vehicle display 259 can be implemented in a number of ways with hardware, software, or a combination thereof. For example, the vehicle display 259 can be a monitor, or a screen such the first device 102 of FIG. 1 as a cellular phone, a heads-up display (HUD). The vehicle display 259 can be a display for the vehicle telematics or infotainment system.

Figure 3:
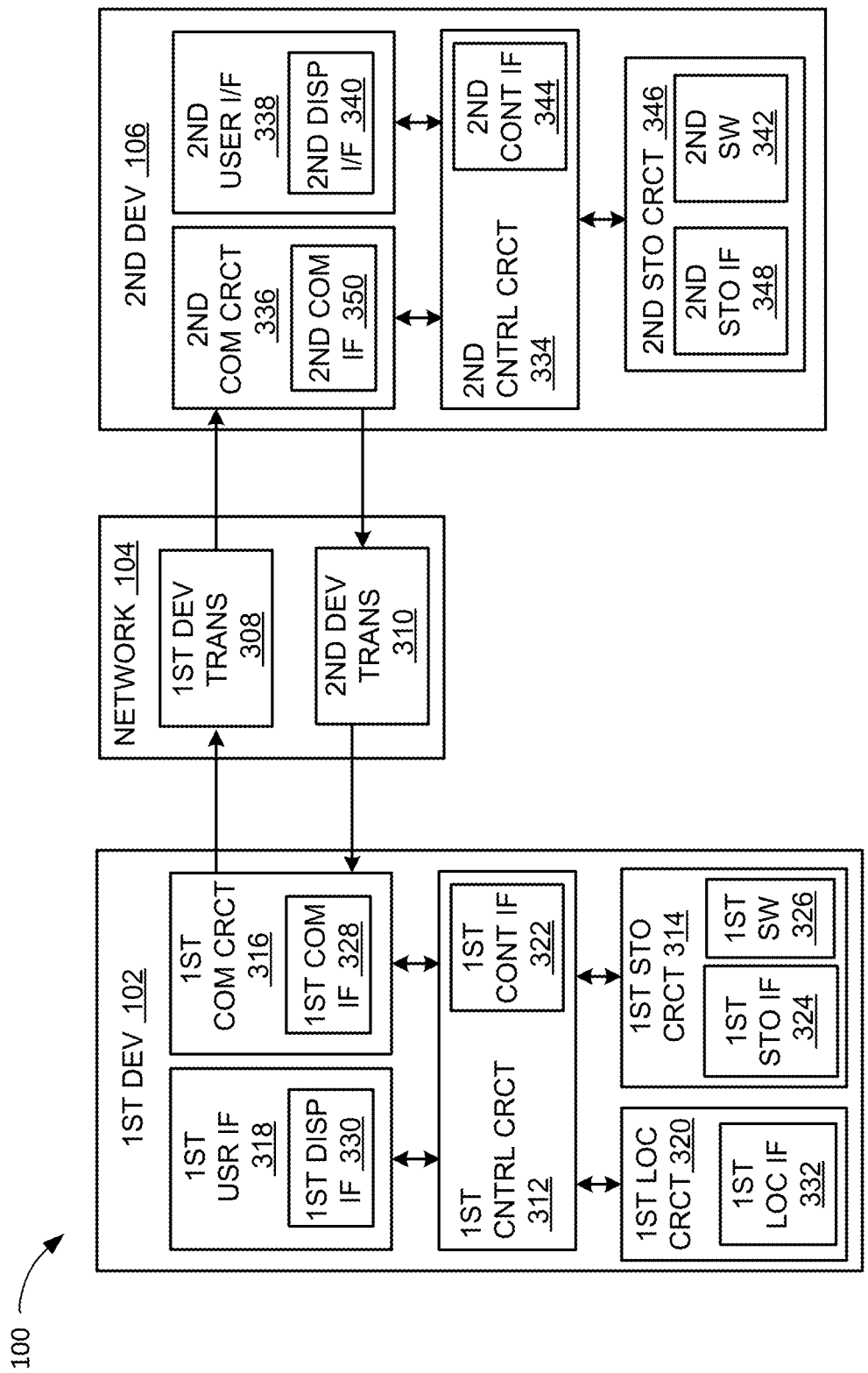
FIG. 3 is an exemplary block diagram of the vehicle system.

Referring now to FIG. 3, therein is shown an exemplary block diagram of the vehicle system 100. The vehicle system 100 can include the first device 102, the communication path 104, and the second device 106. The first device 102 can send information in a first device transmission 308 over the communication path 104 to the second device 106. The second device 106 can send information in a second device transmission 310 of FIG. 3 over the communication path 104 to the first device 102.

For illustrative purposes, the vehicle system 100 is shown with the first device 102 as a client device, although it is understood that the vehicle system 100 can include the first device 102 as a different type of device. For example, the first device 102 can be a server including a display interface.

Also for illustrative purposes, the vehicle system 100 is shown with the second device 106 as a server, although it is understood that the vehicle system 100 can include the second device 106 as a different type of device. For example, the second device 106 can be a client device.

Further for illustrative purposes, the vehicle system 100 is shown with interaction between the first device 102 and the second device 106, although it is understood that the first device 102 can similarly interact another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 to provide the intelligence of the vehicle system 100.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102.

The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the vehicle system 100. The first control circuit 312 can also execute the first software 326 for the other functions of the vehicle system 100, including receiving location information from the first location circuit 320. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial vehicle system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the vehicle system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the vehicle system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

The second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the vehicle system 100 is shown with the second storage circuit 346 as a single hierarchy storage system, although it is understood that the vehicle system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The vehicle system 100 can be executed by the first control circuit 312, the second control circuit 334, or a combination thereof. For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the vehicle system 100 is described by operation of the first device 102 and the second device 106. It is understood that the first device 102 and the second device 106 can operate any of the modules and functions of the vehicle system 100.

Figure 4:
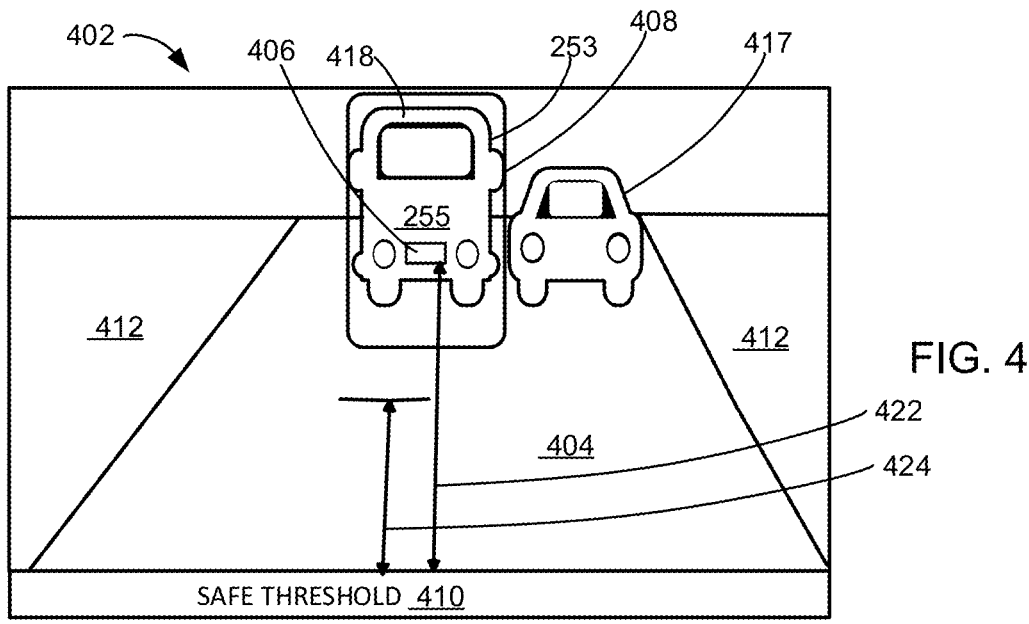
FIG. 4 is an example of a display of the vehicle system.

Referring now to FIG. 4, therein is shown an example of a display of the vehicle system 100. The example of the display can be shown on or in the first device 102 of FIG. 1, the second device 106 of FIG. 1, the vehicle 202 of FIG. 2, or a combination thereof. As a specific example, the display can be shown on the first display interface 330 of FIG. 3, the vehicle display 259 of FIG. 2, or a combination thereof.

The example shown in FIG. 4 depicts a first image 402 further depicting a travel path 404, a non-travel path area 412, an item of interest 417, a target object 418, a bounding box 408, and a communication section 410.

The first image 402 represents a view from the vehicle system 100, the first device 102, the second device 106, the vehicle 202, or a combination thereof behind the target object 418. For brevity and clarity, the first image 402 will be described relative to the view from the first device 102 behind the target object 418, although it is understood that description of the first image 402 can be applicable from the vehicle system 100, the second device 106, the vehicle 202, or a combination thereof.

The item of interest 417 represents aspects depicted in the first image 402 as a potential candidate for the target object 418. The item of interest 417 can be stationary or moving or can change state from moving to stationary and vice versa. In the example shown in FIG. 4, the item of interest 417 is an automobile.

The target object 418 represents an item for analysis by the vehicle system 100, the first device 102, the second device 106, the vehicle 202, or a combination thereof. The target object 418 can be stationary or moving or can change state from moving to stationary and vice versa. In this example, the target object 418 is shown to be a vehicle and can represent an example of the vehicle 202. As a specific example, FIG. 4 depicts the rear portion 255 of the target object 418. Also, as a specific example, FIG. 4 depicts an outline of the side portion 253 of the target object 418.

The example shown in FIG. 4 depicts at least some portion processed by the vehicle system 100, the first device 102, the second device 106, the vehicle 202, or a combination thereof to determine a distance 422 to the target object 418. For brevity and clarity, the operation of the vehicle system 100 will be described relative to the first device 102 traversing the travel path 404 and behind the target object 418 although it is understood that description of the operation can be applicable from the vehicle system 100, the second device 106, the vehicle 202, or a combination thereof.

The distance 422 represents a physical separation between the first device 102 and the target object 418. For example, the distance 422 can represent a category of separation, such as "too close", "far enough", or a combination thereof and not an exact physical measurement. In another example, the distance 422 can be an approximate physical separation. The distance 422 can be dependent on conditions such as speed, weather conditions, road conditions, other vehicles, or a combination thereof. In this example, the distance 422 is shown in the first image 402 and as measure to the target object 418. As a specific example, the distance 422 can represent the physical separation relative to the rear-most extended portion of the rear portion 255. Continuing with this example, the distance 422 can be shown between the rear portion 255 to the top of the communication section 410 or the lower most portion of the first image 402, which would represent the further extend of the first device 102.

The travel path 404 represents a traversal area for the vehicle system 100, the first device 102, the second device 106, the vehicle 202, or a combination thereof. For example, the travel path 404 can include a road, a pathway, a course, an expressway, a highway, a lane, a portion of a parking lot, a roadway, a street, a route, a track, a trail, a byway, or a combination thereof.

The non-travel path area 412 is an area that is not part of the travel path 404. The non-travel path area 412 can also include an area adjacent to the travel path 404. As examples, the non-travel path area 412 can include a sidewalk, a curb, a footpath, a walkway, a ditch, a portion of the travel path 404 intended for other functions such as parking, cycling, walking, or a combination thereof.

The target object 418 can be the item of interest 417 that is ahead, the closest or a combination thereof to the first device 102. As examples, the target object 418 can be moving or stationary. The target object 418 can include the rear portion 255, the side portion 253, or a combination thereof. In FIG. 4, the specific example depicts the rear portion 255 and an outline of the side portion 253 of the target object 418.

In this example shown in FIG. 4, the rear portion 255 is the portion of the target object 418 which is opposite to the front portion 257 of FIG. 2 of the target object 418 and adjacent to the side portion 253 of FIG. 2 of the target object 418. The rear portion 255 can be used to identify the target object 418. For example, the rear portion 255 of the target object 418 can include an identification 406.

The identification 406 provides information about the target object 418 that is unique to the specific instance of the target object 418 or that is associated to the type of item for the target object 418. For example, the identification 406 can include a license plate, or a shape profile of the rear portion 255, a make of the target object 418, a model of the target object 418, or a combination thereof.

The bounding box 408 can aid in the analysis of the target object 418. In this example, the bounding box 408 is shown within the first image 402. The bounding box 408 can isolate or determine the target object 418 as depicted within the first image 402. The bounding box 408 can also provide an outline around any instance of the item of interest 417 in the first image 402 to aid determining whether or not the item of interest 417 would be considered the target object 418.

In this example, the bounding box 408 is shown as an outline encompassing a peripheral profile of the rear portion 255. As specific examples, the bounding box 408 can be shown as a rectangular, a circle, a square, an ellipse, or a combination thereof. The bounding box 408 can be depicted a single color or various colors. As another example, the bounding box 408 can be filled with a single color or multiple colors.

The communication section 410 represents a portion of the first image 402 for displaying notification by the vehicle system 100, the first device 102, the second device 106, the vehicle 202, or a combination thereof. As an example, the communication section 410 can provide notification, information, or an alert regarding the item of interest 417, the target object 418, or a combination thereof. The notification or alert can assist in the operation of the vehicle 202. The communication section 410 can be placed within the first image 402. The notification or alert can also be used assist in coaching a driver to alter the driver behavior or assist in the driver in changing driving behavior. The vehicle system 100 operation of the artificial intelligence model and use of the bounding box 408, the distance 422, the notification, or a combination thereof can be factors to record the driver behavior.

The communication section 410 can provide information about the target object 418. For example, the communication section 410 can provide information about the distance 422 to the target object 418. Also for example, the communication section 410 can provide information relating to the bounding box 408 relative determining a successful outlining of the target object 418. Further for example, the communication section 410 can provide a warning or alert if the distance 422 is below a safe threshold 424.

The safe threshold 424 represent a minimum distance to the target object 418. The safe threshold 424 can be determined or set in a number of ways. For example, the type of the target object 418 can be a factor to determine a value for the safe threshold 424 based on how fast the target object 418, the first device 102, or a combination thereof can typically stop in an emergency situation. Also for example, the determination for the value for the safe threshold 424 can be based the speed of the target object 418, the speed of the first device 102, or a combination thereof.

The communication section 410 can be located in various locations within the first image 402. For example, the communication section 410 can be located on the side of the first image 402. Another embodiment can have the communication section 410 located at the top of the first image 402. Another embodiment can have the communication section 410 located at the bottom of the first image 402 as depicted in FIG. 4.

The communication section 410 can provide information in a number of ways. For example, the communication section 410 can depict information with alphanumeric characters, still images, animated images, video, audio, or a combination thereof. Continuing this example, the communication section 410 can also utilize audio to supplement or in conjunction with the visual depiction. For example, the communication section 410 can depict the safe threshold 424 along with an auditory alarm, a visual alarm, or combination thereof.

Figure 5:
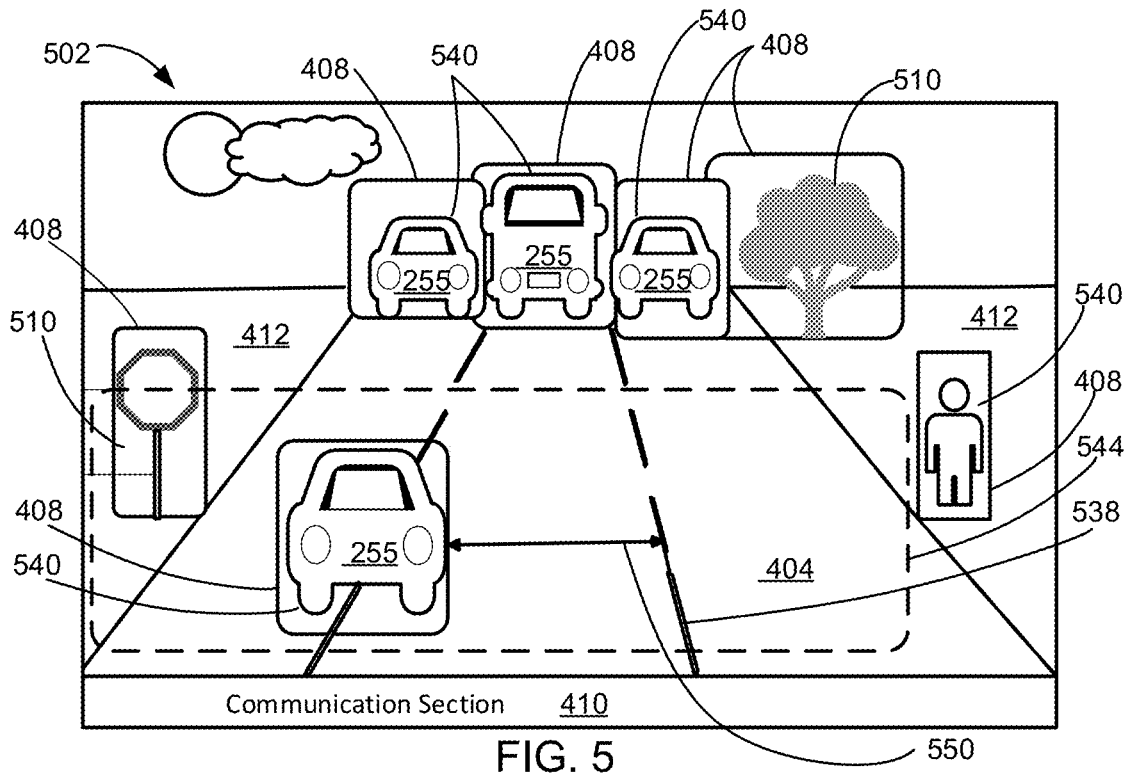
FIG. 5 is a further example of a display of the vehicle system.

Referring now to FIG. 5, therein is shown a further example of a display of the vehicle system 100. The example of the display can be shown on or in the first device 102 of FIG. 1, the second device 106 of FIG. 1, the vehicle 202 of FIG. 2, or a combination thereof. For brevity and clarity, the operation of the vehicle system 100 will be described relative to the first device 102 traversing the travel path 404 and behind the target object 418. As a specific example, the display can be shown on the first display interface 330 of FIG. 3, the vehicle display 259 of FIG. 2, or a combination thereof.

The example shown in FIG. 5 depicts a second image 502. Similar to the first image 402 of FIG. 4, the second image 502 can depict the travel path 404, the first device 102, the second device 106, the vehicle 202, or a combination thereof. Also shown in this example, the second image 502 can depict the non-travel path area 412 adjacent to the travel path 404. Further in this example, the second image 502 can depict a number of instances of the item of interest 417 including a moving object 540, a stationary object 510, a non-target item 538, the bounding box 408, and the communication section 410.

In this example shown in FIG. 5, the travel path 404 is similar to the one shown in FIG. 4. The travel path 404 shown in the example in FIG. 5 includes multiple lanes whereas lanes were not explicitly shown or described in FIG. 4.

Each lane is separated by the non-target item 538. The non-target item 538 is an object that can be identified. The non-target item 538 can be a lane, a surface marking, a Botts dot, a pylon, a barrier, a lane divider, or another physical object. The non-target item 538 is not the target object 418 of FIG. 4, however, the non-target item 538 can be determined to be the item of interest 417 and later re-categorized to the target object 418.

In the example shown in FIG. 5, the second image 502 depicts multiple instances of the moving object 540. As examples, the second image 502 depicts a number of instances of the moving object 540 as vehicles that are not the target object 418 and these vehicles can be instances of the vehicle 202, along different lanes. Also for example, the second image 502 also depicts the moving object 540 as a human person along the non-travel path area 412.

FIG. 5 depicts an example view of the second image 502 with multiple instances of the bounding box 408. One of the moving object 540 shown is an example of a vehicle depicted as switching from one far left lane on the travel path 404 to a center lane on the travel path 404. This instance of the moving object 540 can become the closest vehicle in front of the first device 102 and in the same lane as the first device 102. The bounding box 408 is able to adjust accordingly and follow the moving object 540 from one lane to another lane.

Also as example shown in FIG. 5, the second image 502 depicts multiple instances of the stationary object 510. The stationary object 510 is a non-moving item within the second image 502. The stationary object 510 does not traverse along either the travel path 404, the non-travel path area 412, or a combination thereof without assistance external to the stationary object 510. The stationary object 510 can be found on the non-travel path area 412, the travel path 404, or a combination thereof. As examples, the second image 502 depicts a number of instances of the stationary object 510 that are not the target object 418. As specific examples, the second image 502 depicts a street sign and a tree in the non-travel path area 412.

Returning to the description of the moving object 540, multiple instances of the moving object 540 can be located within a field of view 544, ahead, closest, or a combination thereof to the first device 102. The moving object 540 is within the field of view 544 of the visual sensor 214. In the example shown in FIG. 5, there are several different instances of the moving object 540 at various distances and locations from the first device 102 where the visual sensor 214 is located.

In the example where the moving object 540 is similar to that of the vehicle system 100 as the vehicle 202, the moving object 540 can also include the rear portion 255. As similarly described in FIG. 4, each of the instances of the rear portion 255 can include the identification 406. Also as similarly described in FIG. 4, the rear portion 255 of the moving object 540 can be used to identify the moving object 540, however, not all instances of the moving object 540 is determined to be the target object 418 for analysis for the distance 422 of FIG. 4. In the example shown in FIG. 5, the bounding box 408 performs a number of functions. For example, the bounding box 408 can be utilized to select an object. Also, for example, the bounding box 408 can be used to identify the target object 418. Further for example, the bounding box 408 can be used in the analysis of the target object 418.

In this example, the bounding box 408 is shown around each instance of the moving object 540, the stationary object 510, or a combination thereof to determine if that particular object should be determined to be the target object 418. As described in FIG. 4, the target object 418 can be moving or stationary. Multiple instances of the bounding box 408 shown in FIG. 5 are similarly described to the bounding box 408 in FIG. 4. The bounding box 408 can be temporarily located around the moving object 540, the stationary object 510, or a combination thereof unless one of these objects is determined to be the target object 418.

FIG. 5 further depicts an example of the field of view 544 as shown with the second image 502. The field of view 544 represents an area shown in the second image 502 where the target object 418 can be located. The field of view 544 can also represent the area in-front of the vehicle system 100 where a possible collision, or other activity can occur. In the example shown in FIG. 5, the moving object 540, the stationary object 510 or a combination thereof being located within the vicinity of the vehicle system 100 that can cause an unsafe condition.

For example, an unsafe condition can include the stationary object 510 obstructing the travel path 404 where the vehicle 202 can be travelling on. Also for example, the moving object 540 can be potentially closer, or is closer than the safe threshold 424 of FIG. 4 to the vehicle system 100.

An unsafe condition can further include the moving object 540, the stationary object 510, the target object 418 or a combination thereof becoming an obstruction risk. The field of view 544 can assist in identifying and categorizing the moving object 540 or the stationary object 510, as the target object 418. An object outside the field of view 544 can be recognized as an object and can be categorized as an object that is not of interest.

In another example, the stationary object 510, the moving object 540, or a combination thereof can be partially within the field of view 544 and can be categorized as the target object 418. Specifically, the example shows a street sign as the stationary object 510 that can be partially within the field of view 544. As it enters the field of view 544, the stationary object 510 can be categorized as the target object 418.

Further, an object within the field of view 544 can include the bounding box 408 placed around that object. In this example shown in FIG. 5, the bounding box 408 can function within the first image 402, the second image 502 or a combination thereof to select a recognized object, to highlight the target object 418, to provide an outline to aid in the analysis of the target object 418, or a combination thereof.

Continuing the example, an object outside the field of view 544 can include the bounding box 408 that can function within the first image, 402, the second image 502 or a combination thereof to highlight the moving object 540, the stationary object 510, or a combination thereof to provide an outline to aid in the analysis of that object.

FIG. 5 depicts an example of the moving object 540 within the field of view 544 of the second image 502 that can represent two scenarios. Specifically, in this example, a vehicle similar to the vehicle system 100 is the moving object 540. In a first scenario, as an example, the moving object 540 can move from an outside lane along the travel path 404 into a lane on the travel path 404 directly ahead of the vehicle system 100, and into the field of view 544. The vehicle system 100 would categorize the moving object 540 as the target object 418 because of the unsafe condition. The bounding box 408 can be placed around the moving object 540. In this example, the bounding box 408 can serve to also identify the moving object 540 as the target object 418. The bounding box 408 would then function to highlight the target object 418 for further analysis by the vehicle system 100, such as described in FIG. 4.

Continuing with the example in FIG. 5, in a second scenario, the moving object 540 can move into another lane along the travel path 404 away from the vehicle system 100, and outside of the field of view 544. As the moving object 540 moves out of the area of the field of view 544, the moving object 540 would be no longer be eligible to be categorized as the target object 418.

In addition to the field of view 544, FIG. 5 depicts an example of a lane detection 550. The lane detection 550 can represent a minimum lateral distance to the item of interest 417, the non-target object 538, the target object 418, or a combination thereof. The lateral distance is a distance perpendicular to the direction of travel of the vehicle 202.

The lane detection 550 can be determined or set in a number of ways. For example, the width of the travel path 404 relative to the width of the vehicle 202 can be a factor to determine a value for the lane detection 550. Also for example, the determination for a value for the lane detection 550 can be based on the location of the item of interest 417, the location of the vehicle 202, the location of the non-target object 538 or a combination thereof.

In another example, the lane detection 550 can represent a minimum lateral distance based on the location of the vehicle 202 relative to the non-target object 538, such as a lane divider on the travel path 404. Continuing the example, the lane detection 550 can be modified when there is a change as the vehicle 202 moves from a lane of one width to a lane of a different width.

The communication section 410 can include information about the moving object 540, such as the speed, direction, location, or a combination thereof. The communication section 410 can also include information about the stationary object 510, such as the location, distance, or a combination thereof. The communication section 410 can include information about the non-target item 538. For example, the communication section 410 can depict the lane detection 550 along with an auditory alarm, visual alarm or combination thereof.

Figure 6:
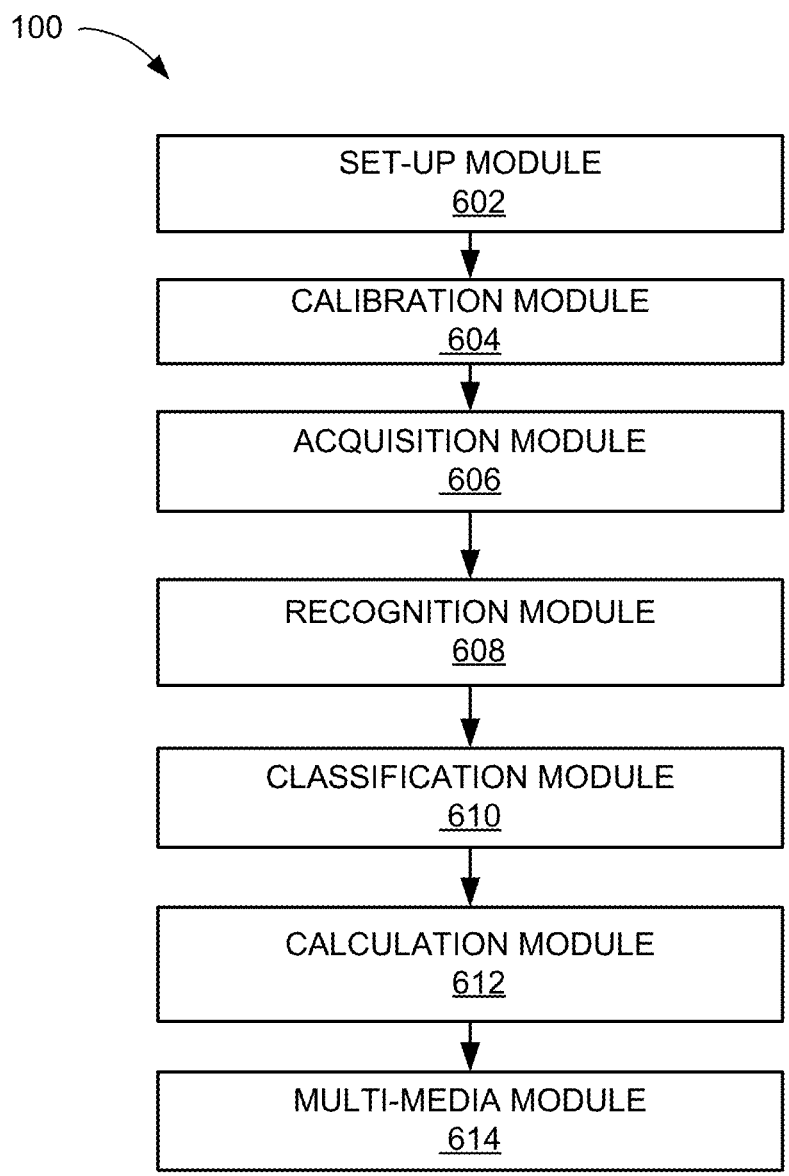
FIG. 6 is an example of a control flow of the vehicle system 100 in an embodiment of the present invention.

Referring now to FIG. 6, therein is shown an example of a control flow of the vehicle system 100 in an embodiment of the present invention. In this example, the vehicle system 100 can include a set-up module 602, a calibration module 604, an acquisition module 606, a recognition module 608, a classification module 610, a calculation module 612, a multi-media module 614, or a combination thereof.

The aforementioned modules can be included in the first software 326 of FIG. 3, the second software 342 of FIG. 3, or a combination thereof. The first software 326, the second software 342, or a combination thereof can be executed with the first control circuit 312 of FIG. 3, the second control circuit 334 of FIG. 3, the vehicle control circuit 206 of FIG. 2, or a combination thereof.

In the example shown in FIG. 6, the set-up module 602 can be coupled to the calibration module 604. The calibration module 604 can be coupled to the acquisition module 606. The acquisition module 606 can be coupled to the recognition module 608. The recognition module 608 can be coupled to the classification module 610. The classification module 610 can be coupled to the calculation module 612. The calculation module 612 can be coupled to the multi-media module 614.

The modules can be coupled using wired or wireless connections, by including an output of one module as an input of the other module, by including operations of one module influence operation of the other module, or a combination thereof. The modules can be directly coupled with no intervening structures or objects other than the connector there-between, or indirectly coupled. The modules can be coupled as function calls or procedural calls within the first software 326, the second software 342, or a combination thereof.

FIG. 6 depicts an example of the set-up module 602. In this example, the set-up module 602 can include the installation through setting-up the vehicle system 100. A further example, the set-up module 602 can involve the installation of the visual sensor 214 of FIG. 2 with the vehicle 202. The visual sensor 214 can be a forward-facing camera or a backward facing-camera. The set-up module 602 can also include the installation of the location-movement sensor 212 of FIG. 2. The installation can also include connectivity setup and verification of the visual sensor 214 to the communication path 104 of FIG. 1. The installation can include installation involving the vehicle system 100, the first device 102 of FIG. 1, the second device 106 of FIG. 1, the first display interface 330 of FIG. 3, the vehicle 202, or a combination thereof.

Continuing with this example, the set-up module 602 can further configure the devices installed. For example, the set-up module 602 can configure the visual sensor 214, the first device 102, the second device 106, the vehicle 202, or a combination thereof to communicate with one another such that images captured by the visual sensor 214 can communicate to the first device 102, the second device 106, or a combination thereof over the communication path 104. The set-up module 602 can configure information received to be depicted on the first display interface 330.

As a specific examples, the set-up module 602 can connect the visual sensor 214 in the vehicle 202 can connect to the local area network within the vehicle 202, such as an in-car Wi-Fi access point (AP). Also as a specific example, the set-up module 602 can further modify the visual sensor 214 to connect to AP in the vehicle 202 rather than directly to a phone, such as the first device 102. Further as a specific example, the first device 102 can also provide a bridge connectivity functionality. The flow can progress from the set-up module 602 to the calibration module 604.

FIG. 6 depicts an example of the calibration module 604. In this example, the calibration module 604 can include adjusting the visual sensor 214. The calibration module 604 adjustments can be made so that the distance 422 in FIG. 4, the safe threshold 424, or a combination thereof can be measured as shown in the first image 402, the second image 502, or a combination thereof captured by the visual sensor 214. In a further example, the calibration module 604 can also adjust portions of the visual sensor 214, such as a lens compensation, an aperture size, a focal distance, a shutter speed, other optic parameters, or a combination thereof.

As further examples, the calibration module 604 can include communicating adjustments of the visual sensor 214 to other modules in the flow chart in FIG. 6. For example, a focal length of the visual sensor 214 can be communicated to the calculation module 612. Also for example, the calibration module 604 can adjust the visual sensor 214 at the time of installation, multiple times, or a combination thereof. The calibration module 604 can communicate the adjustments once or multiple times as adjustments are made to one or more of the modules in FIG. 6.

The calibration module 604 can also train an artificial intelligence (AI) model to recognize various types of vehicles as the target object 418, such as trucks, sport utility vehicles (SUV), bikes, compact vehicles, as the target object 418 of FIG. 4 in the field of view 544 of FIG. 5 with the bounding box 408. The artificial intelligence model can be implemented in a number of ways. For example, the artificial intelligence model can be implemented as a neural network, a fully connected (FC), a multilayer perceptron (MP), convolutional, recurrent (RNN), long short-term memory, or a combination thereof. Further for example, the artificial intelligence model can also utilize transfer learning, reinforcement learning, or a combination thereof.

As an example, the artificial intelligence model can be trained with features of known type of the vehicles as the candidates for the target object 418 based on the perimeter or dimensions, such as the width, the height, or a combination thereof, of the rear portion 255 for each of the vehicle 202. The artificial intelligence model can be trained on the distance 422 of FIG. 4 from the target object 418 based on the dimensions, such as the width, height, or perimeter of the bounding box 408. As a specific example, the calibration module 604 can determine the size or dimensions of the bounding box 408 for particular classes of the vehicles as the target object 418 at particular measures for the distance 422 in the field of view 544 of the visual sensor 214. The width of the bounding box 408 is the side of the perimeter shown to be parallel to the road and perpendicular to the height. The height of the bounding box 408 is the side of the perimeter shown to be perpendicular to the road.

Returning to the calibration of the visual sensor 214, the calibration module 604 can calculate a calibration factor for the particular types or instances of the visual sensor 214, such as a camera or lens, to the size or dimensions of the vehicles as the target object 418 based on the bounding box 408 and measurements for the distance 422 of vehicles as the target object 418 at known distances. As an example, a width of vehicles does not change that much between vehicle categories. As a specific example, the width of the rear portion 255 of vehicles does not change much between vehicle categories.

The term "width" refers to the measure parallel to the ground and not perpendicular to the ground. The term "height" refers to the measure perpendicular to the ground and not parallel to the ground.

Also for example, the calibration module 604 can further train the artificial intelligence model with different categories of vehicles as the target object 418. The training with the different categories results in more accurate measure categories of vehicles need to be detected and calibrated based on size of the bounding box 408. As specific examples, the vehicles as the target object 418 can be a truck, a SUV, a medium car, and a microcar. The artificial intelligence model can use the width as a metric for each calibrated category for the vehicles as the target object 418. Further as a specific example, the artificial intelligence model can be trained with the width of the rear portion 255.

Further for example, the calibration module 604 can also train the artificial intelligence model to recognize with the view of the vehicles as candidates for the target object 418 is not the rear portion 255. As a specific example, the artificial intelligence model can be train to recognize the side portion 253 of FIG. 2, such as in a situation with a vehicle as a candidate to the target object 418 is going through a cross-traffic in an intersection. Also as a specific example, the artificial intelligence model can be training to recognize the front portion 257 of FIG. 2 of the vehicle. The artificial intelligence model can be trained with the front portion 257 and the side portion 253 similarly as the rear portion 255 as previously described.

Yet further for example, the calibration module 604 can train the artificial intelligence model for different elevations, angles, or a combination thereof of the target object 418 relative the visual sensor 214. For example, the artificial intelligence model needs to determine the width of vehicles as candidates for the target object 418 even if the training image of the vehicle is moving along a curve, uphill, downhill, or a combination thereof.

In these non-flat or non-straight examples, the artificial intelligence model can be trained with different views, angles, elevations, or a combination thereof of the rear portion 255, the side portion 253, or a combination thereof. In these examples, the width and other dimensions of the bounding box 408 can be updated to reflect the different views, angles, elevations, or a combination thereof to determine the distance 422. Continuing this example, the calibration module 604 can train the artificial intelligence model to also consider the side portion 253 in addition to the rear portion 255 to determine the distance 422. The bounding box 408 can be optionally sized to include at least a part of the side portion 253. The bounding box 408 can also surround the rear portion 255 and the side portion 253 separately or simultaneously to determine the distance 422. The flow can progress from the calibration module 604 to the acquisition module 606.

FIG. 6 depicts an example of the acquisition module 606. In this example, the acquisition module 606 can capture an image for analysis. For example, the acquisition module 606 can capture the first image 402, the second image 502, or a combination thereof. Continuing the example, the first image 402, the second image 502, or a combination thereof can represent a view from the vehicle system 100, the first device 102, the second device 106, the vehicle 202, or a combination thereof of the item of interest 417 of FIG. 4, the moving object 540 of FIG. 5, the stationary object 510 of FIG. 5, the target object 418 of FIG. 4, or a combination thereof captured with the visual sensor 214.

In a further example, the acquisition module 606 can obtain information or data for analysis. For example, the acquisition module 606 can capture data, such as the speed of the vehicle system 100, the location of the vehicle system 100, or a combination thereof. Also for example, the acquisition module 606 can also capture the first image 402 of FIG. 4, the second image 502 of FIG. 5, or a combination thereof captured by the visual sensor 214. As a specific example, the acquisition module 606 can capture the first image 402, the second image 502, and other data, or a combination thereof periodically or for a predefined and adjustable frame per second. As specific examples, the acquisition module 606 can capture every second or longer to a range spanning minutes depending on factors, such as how close or far the target object 418 is, traffic condition, or a combination thereof. The information, data or a combination thereof captured by the acquisition module 606 can be communicated to other modules in FIG. 6.

In another example, the vehicle system 100 can have number of sensor devices. Examples of the sensor devices can include the environmental sensors 210 of FIG. 2, a radar sensor 261 of FIG. 2, the accessory sensor 218 of FIG. 2, the volume sensor 220 of FIG. 2, or a combination thereof. The acquisition module 606 can obtain information from each sensor device.

Data captured by the acquisition module 606 can be associated with other data based on the time the data is captured, the location where the data is captured or a combination thereof. For example, the data captured can include a total distance travelled, distance for a trip, the safe threshold 424 of FIG. 4, and the lane detection 550 of FIG. 5. In another example, the data captured can include speed and outdoor weather conditions. The flow can progress from the acquisition module 606 to the recognition module 608.

FIG. 6 depicts an example of the recognition module 608. In this example, the recognition module 608 can identify the item of interest 417. The recognition module 608 operate with what is depicted within the first image 402, the second image 502, or a combination thereof. For example, the recognition module 608 can identify the moving object 540, the stationary object 510, or a combination thereof as the item of interest 417. The recognition module 608 can also identify the item of interest 417 as moving or stationary. Also for example, the recognition module 608 can operate within the field of view 544 of the first image 402, the second image 502, or a combination thereof.

The recognition module 608 can identify of the item of interest 417 in a number of ways. For example, the recognition module 608 can detect motion or difference in motion or acceleration for the instances of the item of interest 417 depicted in the first image 402, the second image 502, or a combination thereof or within the field of view 544. As specific example, the recognition module 608 can identify the item of interest 417 as the moving object 540 based on a velocity or change in velocity of the item of interest 417 relative to the vehicle system 100. Also as a specific example, the recognition module 608 can identify the item of interest 417 as the stationary object 510 relative to the vehicle system 100. With the examples mentioned, it is noted that the vehicle system 100 can be in motion or stationary and changes with items relative to the vehicle system 100.

Also for example, an aspect of the item of interest 417 can be the identification 406 of FIG. 4. The identification 406 provides information about the moving object 540, the stationary object 510, or a combination thereof that is unique to the specific instance of the moving object 540, the stationary object 510, or a combination thereof. For example, the identification 406 can include a license plate, a shape profile of the rear portion 255, a make, a model or a combination thereof of the moving object 540, the stationary object 510, or a combination thereof. In a further example, the recognition module 608 can sort an item into a category. A category can include a make, a model, a genus, a species, a movement property, a location property, a physical feature, or a combination thereof.

The recognition module 608 can utilize the artificial intelligence model locate the bounding box 408 around the item of interest 417. For example, the recognition module 608 can place the bounding box 408 around the moving object 540. Continuing the example, the recognition module 608 can identify the stationary object 510 and not place or optionally place the bounding box 408 around that item.

Also for example, the recognition module 608 can utilize the artificial intelligence model to identify the item of interest 417 based on the aspects of the item of interest 417. As examples, the aspects can include the rear portion 255, the side portion 253, or a combination thereof. The recognition module 608 can also utilize information as elevation, curvature, or a combination thereof. The recognition module 608 can operate the artificial intelligence model to offset the bounding box 408 based on elevation, curvature, or a combination thereof. The flow can progress from the recognition module 608 to the classification module 610.

FIG. 6 depicts an example of the classification module 610. The classification module 610 can categorize the item of interest 417 identified by the recognition module 608 within the first image 402, the second image 502, or a combination thereof.

The classification module 610 can categorize the item of interest 417 using the field of view 544, the safe threshold 424, information provided by the recognition module 608, or a combination thereof.

For example, the classification module 610 can categorize if the item of interest 417 is within the field of view 544 or not. Using information from the recognition module 608, the classification module 610 can further categorize if the item of interest 417 is the moving object 540, the stationary object 510, or a combination thereof. The classification module 610 can further categorize if the item of interest 417 is located on the travel path 404, the non-travel path area 412, or a combination thereof. The classification module 610 can determine if the item of interest 417 is positioned in-front of the vehicle system 100, in the same lane, beyond the safe threshold 424, or a combination thereof. The classification module 610 can use an accelerometer in the vehicle 202, the visual sensor 214, the first device 102, or a combination to determine direction of the target object 418 and the artificial intelligence model can utilize the direction to locate the bounding box 408 based on the curvature, elevation, or a combination thereof.

The classification module 610 can categorize if the item of interest 417 is the target object 418, the non-target item 538 or a combination thereof. As an example, the classification module 610 can operate on, the moving object 540, the stationary object 510, or a combination thereof, identified by the recognition module 608, and can be categorized as the target object 418, the non-target item 538, or a combination thereof.

The classification module 610 can locate the bounding box 408 around the item of interest 417. For example, the classification module 610 can place the bounding box 408 around the item of interest 417 categorized as the target object 418. Continuing the example, the classification module 610 can identify the item of interest 417 as the non-target item 538 and not place or optionally place the bounding box 408 around that item. The flow can progress from the classification module 610 to the calculation module 612.

FIG. 6 depicts an example of the calculation module 612. In this example, the calculation module 612 can determine the distance 422 of FIG. 4 between the first device 102 and the target object 418. The recognition module 608 and the classification module 610 can identify the target object 418 as depicted within the first image 402, the second image 502 or a combination thereof.

As an example, the calculation module 612 can utilize or operate the artificial intelligence model determine dimensions of the bounding box 408 based on the rear portion 255 of the target object 418. The dimension can include a length, a width, a perimeter, or a combination thereof. The dimension of the bounding box 408, along with the lens parameter from the visual sensor 214, or a combination thereof can be used by the artificial intelligence model to calculate or generate the distance 422 between the first device 102 and the target object 418.

In another example, the calculation module 612 can locate the bounding box 408 within the first image 402, the second image 502, or a combination thereof. Continuing with the example, the calculation module 612 can place multiple instances of the bounding box 408 depicted in the first image 402, the second image 502, or a combination thereof. Further, the calculation module 612 can change the dimension of the bounding box 408 as the distance 422 changes in the first image 402, the second image 502, or a combination thereof.

The calculation module 612 can search for the identification 406 of the model of the target object 418 with the rear portion 255 of FIG. 4. The calculation module 612 can look-up a dimensions, sizes, a length, a width, a perimeter, or a combination thereof of the target object 418. As a specific example, the calculation module 612 can look-up dimensions from a database for information associated with the target object 418 including the rear portion 255 of FIG. 2, the side portion 253, or a combination thereof. The calculation module 612 can determine the location, and the size for the bounding box 408 to be placed in the first image 402, the second image 502, or a combination thereof to aid in determining the distance 422.

In a further example, the calculation module 612 can compute the safe threshold 424. The calculation module 612 can compute the safe threshold 424 based on a lens parameter of the visual sensor 214, the first device 102, and a predetermined distance provided to the calculation module 612.

The calculation module 612 can also record the distance 422. The calculation module 612 also record the distance as part of the trip to indicate the driving-behind-distance for the particular points of the trip. The calculation module 612 can record the distance 422 separately and use for alerts and driver coaching. The recorded information for the distance 422 can be utilized to assist in the operation of the vehicle 202.

In this embodiment, the calculation module 612 or the vehicle system 100 can utilize the recorded driving distance to combine with other driving behaviors (speeding, braking, etc.) so that a full picture of the behavior can be given and potentially used for coaching. Further as an example, the vehicle system 100 can use the distance 422 recorded as a simple binary factor based on what distance was measured when combined with speed. The vehicle system 100 can utilize a variable factor so that the criteria can be used or determined later. For example, the distance along with speed can be mapped into time-behind-the-ahead-vehicle or to a function between 2 seconds or more and 0 to show the relative distance the driver is behind at that point. The flow can progress from the calculation module 612 to the multi-media module 614.

FIG. 6 depicts an example of the multi-media module 614. In this example, the multi-media module 614 can depict the first image 402, the second image 502, or a combination thereof. In an example the multi-media module 614 can provide visual depictions of the distance 422, the safe threshold 424, or a combination thereof. In a further example, the multi-media module 614 can depict the target object 418 with the bounding box 408 within the first image 402, the second image 502, or a combination thereof. In another example, the multi-media module 614 can depict information regarding the distance 422, the safe threshold 424, or a combination thereof or relative to each other in the communication section 410.

The multi-media module 614 can present an image, an alphanumeric character, a sound, a video, or a combination thereof.

The multi-media module 614 can be implemented in a number of ways with hardware, software, or a combination thereof. For example, the multi-media module 614 can be a monitor, or a screen such the first device 102 of FIG. 1 as a cellular phone, a heads-up display (HUD). In another example, the multi-media module 614 can be the vehicle display 259.

It has been discovered that the vehicle system 100 can provide the efficient of measuring distance for cars in front in real-time and lower cost. Real-time can refer to the duration of time during which the system is able to provide feedback or communication. Real-time processing refers to as information is available, the information is transmitted and processed with no intermediate storage for the purpose of delayed or post-processing. Real-time can include processing input data within milliseconds so that it is available as feedback to a user (not shown), or to another system. The vehicle system 100 utilizes a trained artificial intelligence model to use minimal information from the bounding box 408 around the car in front or the target object 418. The minimal information is the width and perhaps the perimeter of the bounding box to ascertain the distance of the target object 418 in front. The dimensions, including the width, of the bounding box 408 can quickly represent the distance 422 because of the training of artificial intelligence model with the rear portion 255 of the target object and for various vehicle types and models. The artificial intelligence model of the vehicle system 100 also is trained to compensation for different elevations and relative locations on curves or both to accurately measure the distance 422. The vehicle system 100, the artificial intelligence model, or a combination thereof can also work with the side portion 253 of the target object 418 as well to help generate the accuracy of the distance 422.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The modules can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The vehicle system 100 has been described with module functions or order as an example. The vehicle system 100 can partition the modules differently or order the modules differently. For example, the loops can be different or be eliminated.

For illustrative purposes, the various modules have been described as being specific to the first device 102, the second device 106, the vehicle 202, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, the vehicle storage circuit 208, or a combination thereof, or a portion therein can be removable from the first device 102, the second device 106, the vehicle 202. Examples of the non-transitory computer readable medium can be a non-volatile memory card or stick, an external hard disk drive, a tape cassette, or an optical disk.

The physical transformation of the bounding box 408 and the resulting value for the distance 422 generated from the dimensions of the bounding box 408 affects the real world in terms of generating alerts with the distance 422 is below the safe threshold 424 and affecting the operation of the vehicle 202 to operate at the distance 422 beyond the safe threshold 424. The change in operation of the vehicle 202 can affect the operation of the vehicle system 100 not only for the distance 422 being generated by the bounding box 408 around the target object 418 but also the recording of the information for driver behavior.

Figure 7:
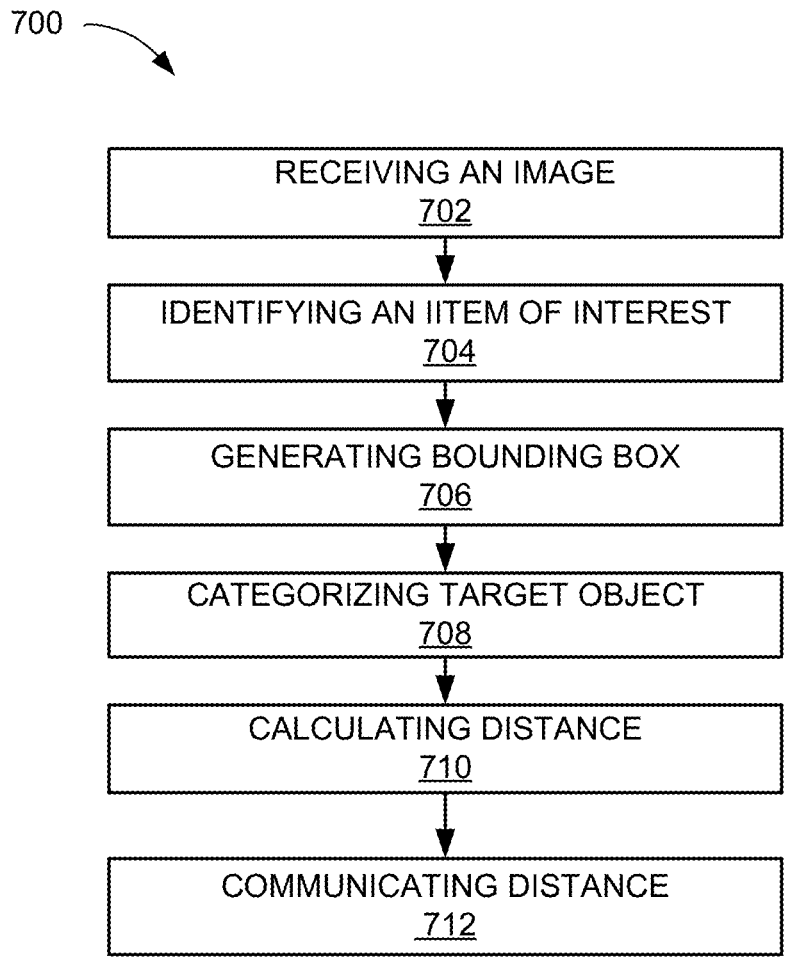
FIG. 7 is a flow chart of a method of operation of a vehicle system in an embodiment of the present invention.

Referring now to FIG. 7, therein is shown a flow chart of a method 700 of operation of a vehicle system 100 in an embodiment of the present invention. The method 700 includes: receiving an image from a visual sensor in a box 702, identifying an item of interest based on the image in a box 704, generating a bounding box around the item of interest in a box 706, categorizing a target object based on the item of interest within the bounding box in a box 708, calculating a distance based on a width of the bounding box in a box 710, and communicating the distance for assisting in operation of the vehicle in a box 712.

As an example, the method 700 further includes determining an identification of the target object within the bounding box; and calculating the width of the bounding box based on the identification of the target object. Further as an example, the method 700 includes generating the bounding box around the item of interest includes detecting the item of interest in a field of view of the image.

Also as an example, the method 700 includes calculating the width of the bounding box based on a rear portion of the target object. Further as an example, the method 700 includes calculating the distance includes calculating the distance from the target object. Yet further as an example, the method 700 includes categorizing the target object based on the item of interest on a travel path. Still further as an example, the method 700 includes adjusting the visual sensor.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a vehicle system comprising:
   receiving an image from a visual sensor;
   identifying an item of interest based on the image, the item of interest being a potential candidate for a target object;
   detecting the item of interest in a field of view of the image in which the target object can be identified, and generating a bounding box around the target object, wherein the field of view is an area in front of a vehicle where a collision can occur;
   categorizing the target object based on the item of interest within the bounding box including categorizing the item of interest from among a make, a model, a genus, a species, a movement property, a location property, and a physical feature;
   calculating a safe threshold distance for performing an emergency stop based on the speed of the vehicle;
   identifying an unsafe condition of the item of interest by re-categorizing a non-target item entering the field of view as the target object, including the genus of a human person identified as the item of interest;
   calculating a distance based on a width of the bounding box includes selecting the target object causing the unsafe condition; and
   communicating the distance for assisting in operation of the vehicle including providing a feedback if the distance to the target object is less than the safe threshold.

2. The method as claimed in claim 1 further comprising:
   determining an identification of the target object within the bounding box; and
   calculating the width of the bounding box based on the identification of the target object.

3. The method as claimed in claim 1 wherein calculating a safe threshold distance for performing an emergency stop includes determining the speed of the vehicle and the speed of the target object.

4. The method as claimed in claim 1 further comprising calculating the width of the bounding box based on a rear portion of the target object.

5. The method as claimed in claim 1 wherein calculating the distance includes calculating the distance from the target object.

6. The method as claimed in claim 1 wherein categorizing the target object based on the item of interest on a travel path.

7. The method as claimed in claim 1 further comprising adjusting the visual sensor.

8. A vehicle system comprising:
   a control circuit configured to:
   receive an image from a visual sensor,
   identify an item of interest based on the image, the item of interest being a potential candidate for a target object,
   detect the item of interest in a field of view of the image in which the target object can be identified, and generate a bounding box around the target object, wherein the field of view is an area in front of a vehicle where a collision can occur,
   categorize the target object based on the item of interest within the bounding box includes the item of interest from among a make, a model, a genus, a species, a movement property, a location property, and a physical feature,
   calculate a safe threshold distance for performing an emergency stop based on the speed of the vehicle,
   identify an unsafe condition of the item of interest by a non-target item entering the field of view re-categorized as the target object, includes the genus of a human person identified as the item of interest,
   calculate a distance based on a width of the bounding box includes the target object causing the unsafe condition selected; and
   a communication circuit, coupled to the control circuit, configured to:
   communicate the distance for assisting in operation of the vehicle includes a feedback provided if the distance to the target object is less than the safe threshold.

9. The vehicle system as claimed in claim 8 wherein the control circuit is further configured to:
   determine an identification of the target object within the bounding box; and
   calculate the width of the bounding box based on the identification of the target object.

10. The vehicle system as claimed in claim 8 wherein the control circuit is further configured to calculate a safe threshold distance for performing an emergency stop includes determining the speed of the vehicle and the speed of the target object.

11. The vehicle system as claimed in claim 8 wherein the control circuit configured to calculate the width of the bounding box based on a rear portion of the target object.

12. The vehicle system as claimed in claim 8 wherein the control circuit is further configured to calculate the distance including calculating the distance from the target object.

13. The vehicle system as claimed in claim 8 wherein the control circuit is further configured to categorize the target object based on the item of interest on a travel path.

14. The vehicle system as claimed in claim 8 wherein the control circuit is further configured to adjust the visual sensor.

15. A non-transitory computer readable medium including instructions executable by a processor comprising:
    receiving an image from a visual sensor;
    identifying an item of interest based on the image, the item of interest being a potential candidate for a target object;
    detecting the item of interest in a field of view of the image in which the target object can be identified, and generating a bounding box around the target object, wherein the field of view is an area in front of a vehicle where a collision can occur;
    categorizing the target object based on the item of interest within the bounding box including categorizing the item of interest from among a make, a model, a genus, a species, a movement property, a location property, and a physical feature;
    calculating a safe threshold distance for performing an emergency stop based on the speed of the vehicle;
    identifying an unsafe condition of the item of interest by re-categorizing a non-target item entering the field of view as the target object, including the genus of a human person identified as the item of interest;
    calculating a distance based on a width of the bounding box includes selecting the target object causing the unsafe condition;
    communicating the distance for assisting in operation of the vehicle including providing a feedback if the distance to the target object is less than the safe threshold.

16. The non-transitory computer readable medium as claimed in claim 15 further comprising:
    determining an identification of the target object within the bounding box; and
    calculating the width of the bounding box based on the identification of the target object.

17. The non-transitory computer readable medium as claimed in claim 15 wherein calculating a safe threshold distance for performing an emergency stop includes determining the speed of the vehicle and the speed of the target object.

18. The non-transitory computer readable medium as claimed in claim 15 further comprising calculating the width of the bounding box based on a rear portion of the target object.

19. The non-transitory computer readable medium as claimed in claim 15 wherein calculating the distance includes calculating the distance from the target object.

20. The non-transitory computer readable medium as claimed in claim 15 wherein categorizing the target object based on the item of interest on a travel path.

\* \* \* \* \*